United States Patent
Niu et al.

(10) Patent No.: US 12,526,114 B2
(45) Date of Patent: Jan. 13, 2026

(54) METHODS AND APPARATUS FOR SIGNALING AND STATE TRANSITION FOR PDCCH SKIPPING AND SSSG SWITCHING

(71) Applicant: APPLE INC., Cupertino, CA (US)

(72) Inventors: Huaning Niu, San Jose, CA (US);
Dawei Zhang, Saratoga, CA (US);
Haitong Sun, Cupertino, CA (US);
Hong He, San Jose, CA (US);
Oghenekome Oteri, San Diego, CA (US); Sigen Ye, San Diego, CA (US);
Wei Zeng, Saratoga, CA (US);
Weidong Yang, San Diego, CA (US);
Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 340 days.

(21) Appl. No.: 17/905,284

(22) PCT Filed: Sep. 24, 2021

(86) PCT No.: PCT/CN2021/120269
§ 371 (c)(1),
(2) Date: Aug. 30, 2022

(87) PCT Pub. No.: WO2023/044738
PCT Pub. Date: Mar. 30, 2023

(65) Prior Publication Data
US 2024/0195572 A1 Jun. 13, 2024

(51) Int. Cl.
*H04L 12/00* (2006.01)
*H04L 5/00* (2006.01)

(52) U.S. Cl.
CPC .......... *H04L 5/0053* (2013.01); *H04L 5/0094* (2013.01)

(58) Field of Classification Search
CPC ............................ H04L 5/0053; H04L 5/0094
See application file for complete search history.

(56) References Cited

U.S. PATENT DOCUMENTS

2023/0030756 A1* 2/2023 Zhang ................. H04L 5/0053
2023/0156572 A1* 5/2023 Reial ................. H04W 72/0466
370/329

(Continued)

FOREIGN PATENT DOCUMENTS

| CN | 113163473 A | 7/2021 |
|---|---|---|
| WO | 2020197293 A1 | 10/2020 |
| WO | 2020246858 A1 | 12/2020 |

OTHER PUBLICATIONS

Moderator (VIVO), "FL summary#1 of DCI-based power saving adaptation", R1-2108224, 3GPP TSG RAN WG1#106-e, E-Meeting, Agenda Item 8.7.2, Aug. 16- 27, 2021, 34 pages.

(Continued)

*Primary Examiner* — Noel R Beharry
*Assistant Examiner* — Lionel Preval
(74) *Attorney, Agent, or Firm* — Dorsey & Whitney LLP

(57) ABSTRACT

Systems and methods provide for physical downlink control channel (PDCCH) monitoring adaptation. A user equipment (UE) may monitor a default search space set group (SSSG) for downlink control information (DCI) from a base station in the PDCCH. In response to a first DCI trigger, the UE switches from monitoring the default SSSG to monitoring a first non-default SSSG associated with a first timer. In response to a second DCI trigger, the UE switches from monitoring the first non-default SSSG to monitoring a second non-default SSSG associated with a second timer. The first non-default SSSG may be a non-empty SSSG including a search space set with at least one associated search space. The second non-default SSSG may be an (Continued)

empty SSSG with no associated search space to emulate PDCCH skipping.

19 Claims, 8 Drawing Sheets

(56) References Cited

U.S. PATENT DOCUMENTS

2023/0362954 A1\* 11/2023 Moon ............... H04W 72/0446
2024/0235787 A1\*  7/2024 Shubhi .................. H04L 5/0094

OTHER PUBLICATIONS

PCT/CN2021/120269, International Search Report and Written Opinion, Mar. 29, 2022, 9 pages.
Ericsson, "DL signals and channels for NR-U", R1-1912707, 3GPP TSG-RAN WG1 Meeting #98bis, Reno, Nevada, USA, Agenda Item 7.2.2.1.2, Nov. 18-22, 2019, 25 pages.
Moderator (VIVO), "FL summary#5 of DCI-based power saving adaptation", R1-2108620, 3GPP TSG RAN WG1#106-e, e-Meeting, Agenda Item 8.7.2, Aug. 16-17, 2021, 89 pages.

\* cited by examiner

METHODS AND APPARATUS FOR SIGNALING AND STATE TRANSITION FOR PDCCH SKIPPING AND SSSG SWITCHING

TECHNICAL FIELD

This application relates generally to wireless communication systems, including adaptive physical downlink control channel (PDCCH) monitoring.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE), 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component or device that may establish a connection to a network and is configured with the hardware, software, and/or firmware to exchange information and data with the network. Therefore, the UE as described herein is used to represent any appropriate electronic component or device.

Effort is made in the telecommunication industry to improve the power consumption of NR mobile devices. For example, NR systems support a connected mode, an idle mode, and an inactive mode. In a connected mode, a UE can receive and/or send traffic from/to a network. If no traffic exists, the UE can move to the idle mode and then, depending on the inactivity, to the inactive mode. In the idle and inactive modes, power savings can be achieved relative to the connected mode, with the inactive mode providing the most power saving. Further, within the connected mode. NR systems may support discontinuous reception (DRX) for additional power saving. During an "on duration" of a DRX cycle, the UE wakes up and monitors a physical downlink control channel (PDCCH) search space (SS) in a slot for downlink control information (DCI) that schedules the traffic exchange with the network. If no traffic is scheduled, the UE enters a sleep mode, whereby it consumes less power. If traffic is scheduled, the UE remains awake to then receive and/or transmit the traffic from/to the network. In NR, a slot represents a unit of time that can be dynamically adjusted. A PDCCH search space refers to time and frequency resources in the downlink resource grid where PDCCH may be carried. The UE performs blind decoding throughout PDCCH search spaces trying to find PDCCH data (e.g., DCI).

Efforts to enhance power saving techniques for connected mode UE, while reducing or minimizing system performance impact, include extending 3GPP Release 16 (Rel-16) DCI-based power saving adaptation during a DRX active timer for an active bandwidth part (BWP), which includes PDCCH monitoring reduction when a connected mode DRX (C-DRX) is configured. For example, a proposal aimed to increase the power saving for C-DRX includes switching the PDCCH search space monitoring from every slot to slot intervals (e.g., every two or more slots). Another proposal aimed to increase the power saving for C-DRX includes skipping the PDCCH search space monitoring by a certain slot interface (e.g., no PDCCH search space monitoring is performed during twelve consecutive slots).

Figure 5:
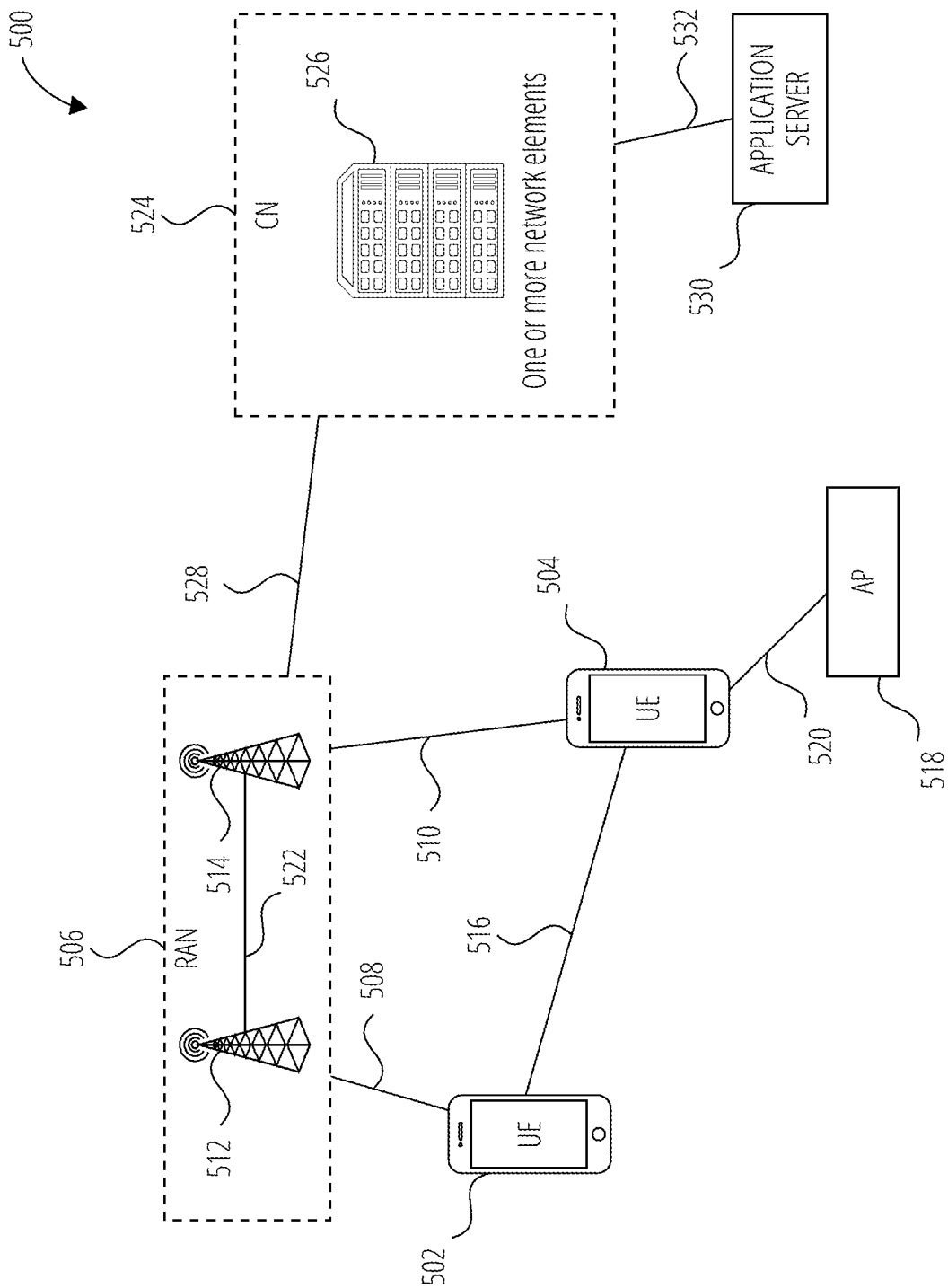
FIG. 5 illustrates an example architecture of a wireless communication system, according to embodiments disclosed herein.
Figure 6:
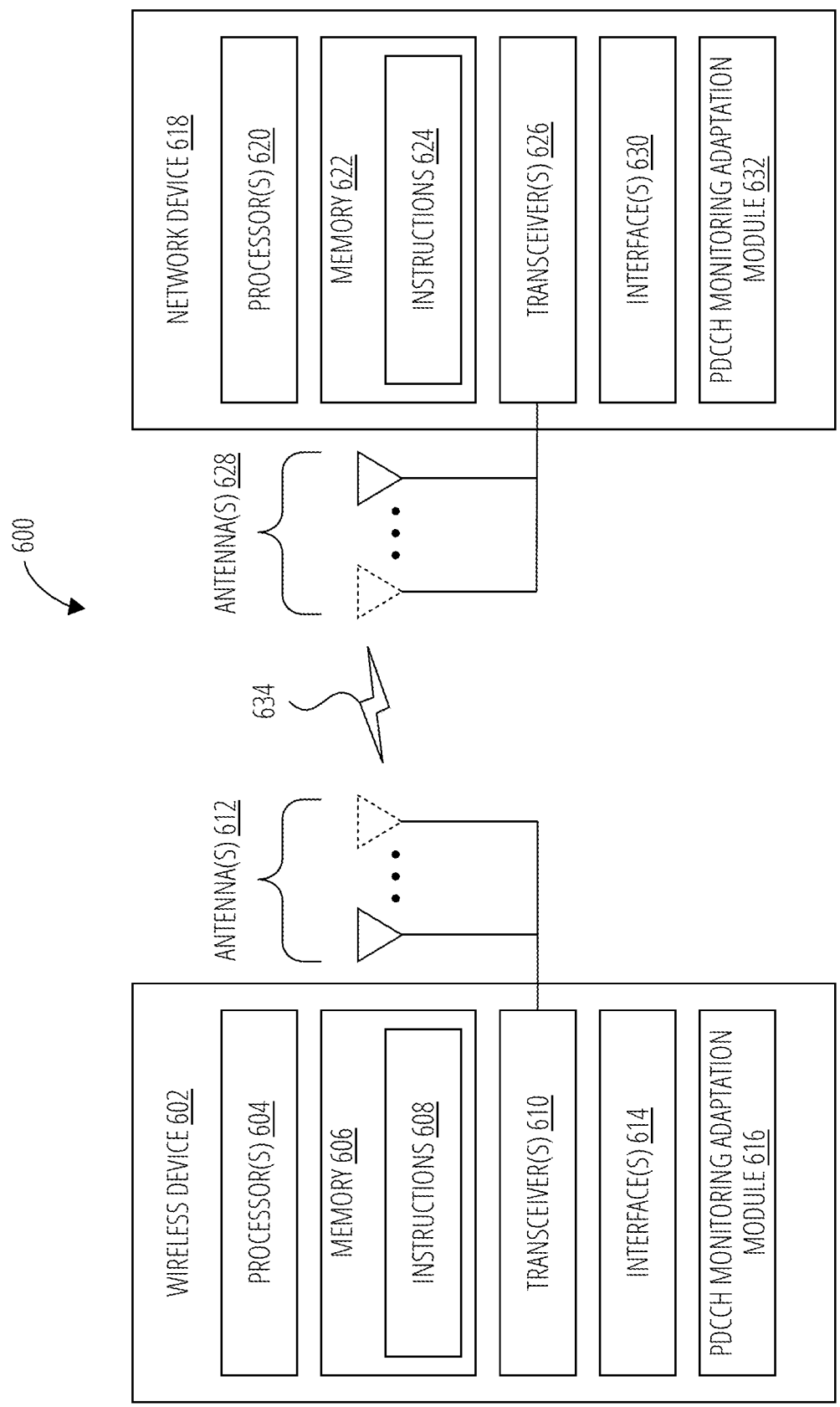
FIG. 6 illustrates a system for performing signaling between a wireless device and a network device, according to embodiments disclosed herein.

In various embodiments of the present disclosure, a UE and a base station, such as the UE 502 and the base station 512 shown in FIG. 5 (or the wireless device 602 and the network device 618 shown in FIG. 6), support a connected mode in which the UE can exchange traffic with the base station (e.g., send and/or receive data). In the connected mode, the UE and the base station can also support DRX (i.e., C-DRX) to improve the power consumption of the UE. During the on duration of a DRX cycle, the base station can schedule traffic exchange for the UE. To do so, the base station sends DCI to the UE, where the DCI schedules the traffic exchange. DCI can be sent on the PDCCH and can indicate downlink/uplink resources for PDSCH and/or for physical uplink shared channel (PUSCH).

Generally, the UE can monitor a candidate set of PDCCHs in one or more control resource sets (CORESETs) on an active downlink (DL) BWP on each activated serving cell according to corresponding search spaces. The monitoring can include decoding (or attempting to decode) some or all PDCCH candidates in the candidate set according to monitored DCI formats. The candidate set for the UE to monitor can be defined in terms of PDCCH search spaces. In C-DRX, the UE can monitor PDCCH candidates in slots that are within the on duration of the DRX cycle.

A search space can be a common search space (CSS) or a UE-specific search space (USS), generally referred to herein as PDCCH search spaces. A search space may include a plurality of PDCCH candidates associated with each aggregation level (e.g., where PDCCH candidates differ regarding the DCI formats to monitor). In turn, a search space set (SSS) may comprise a plurality of search spaces, but being associated with the same CORESET. The CORESET configuration defines the frequency resources for the search space set and thus for the PDCCH candidates of search spaces in the set. The CORESET configuration also defines the duration of the search space set, which can have a length of one to three orthogonal frequency division multiplexing (OFDM) symbols. The start time is configured by the search space set configuration (e.g., at which OFDM symbol the UE starts monitoring the PDCCH of the search spaces of the set). In combination, the configuration of the search space set and the configuration of the CORESET provide a definition in the frequency and time domains about the PDCCH monitoring of the UE.

A plurality of search space sets may be grouped, referred to herein as a search space set group (SSSG), for monitoring of the PDCCH. Different SSSGs may differ from one another by when and/or how long the UE is configured to monitor the PDCCH during a slot. A single search space set can be part of more than one SSSG.

Figure 1A:
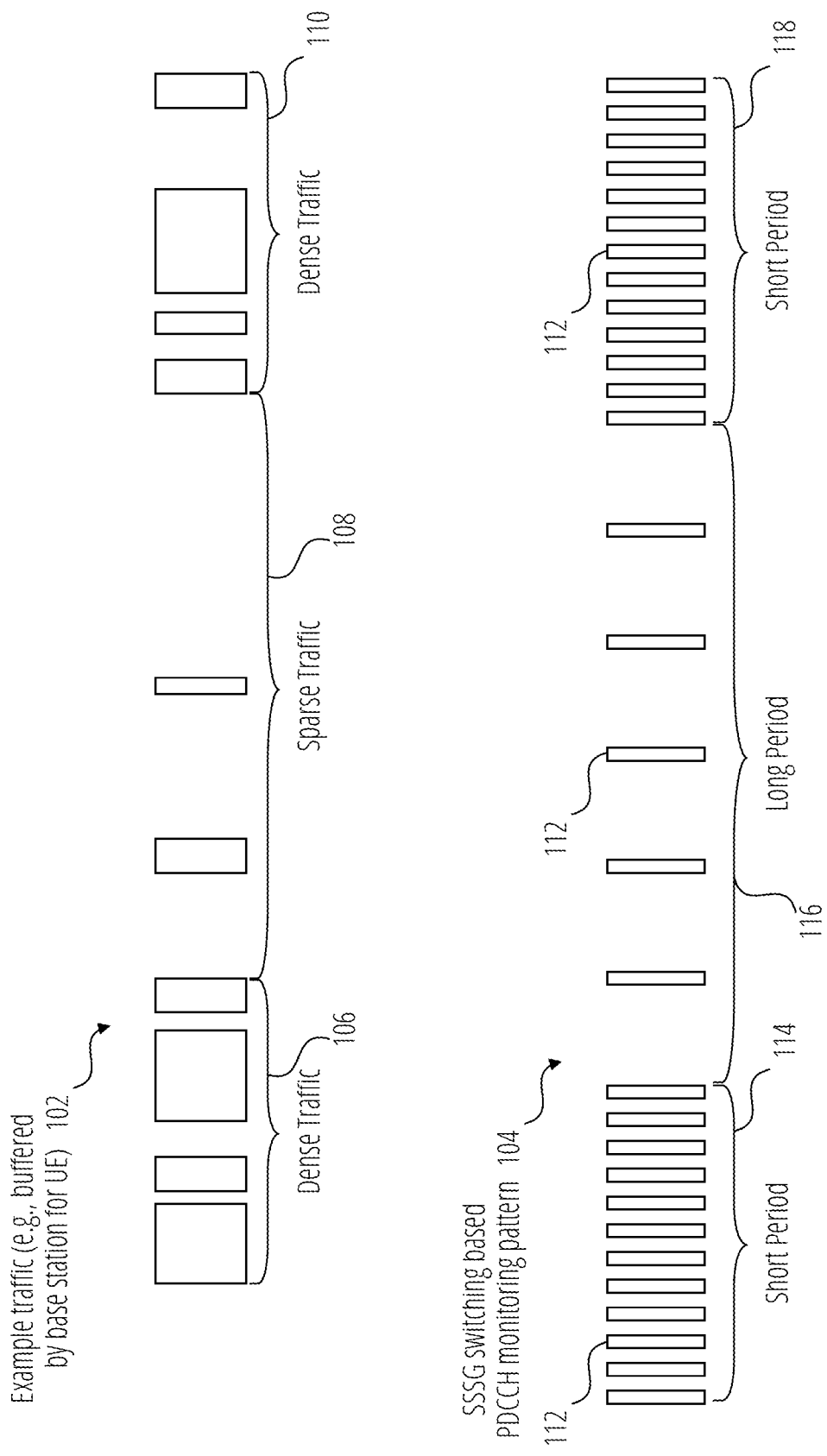
FIG. 1A illustrates an example of switching PDCCH monitoring periodicity in accordance with one embodiment.
Figure 1B:
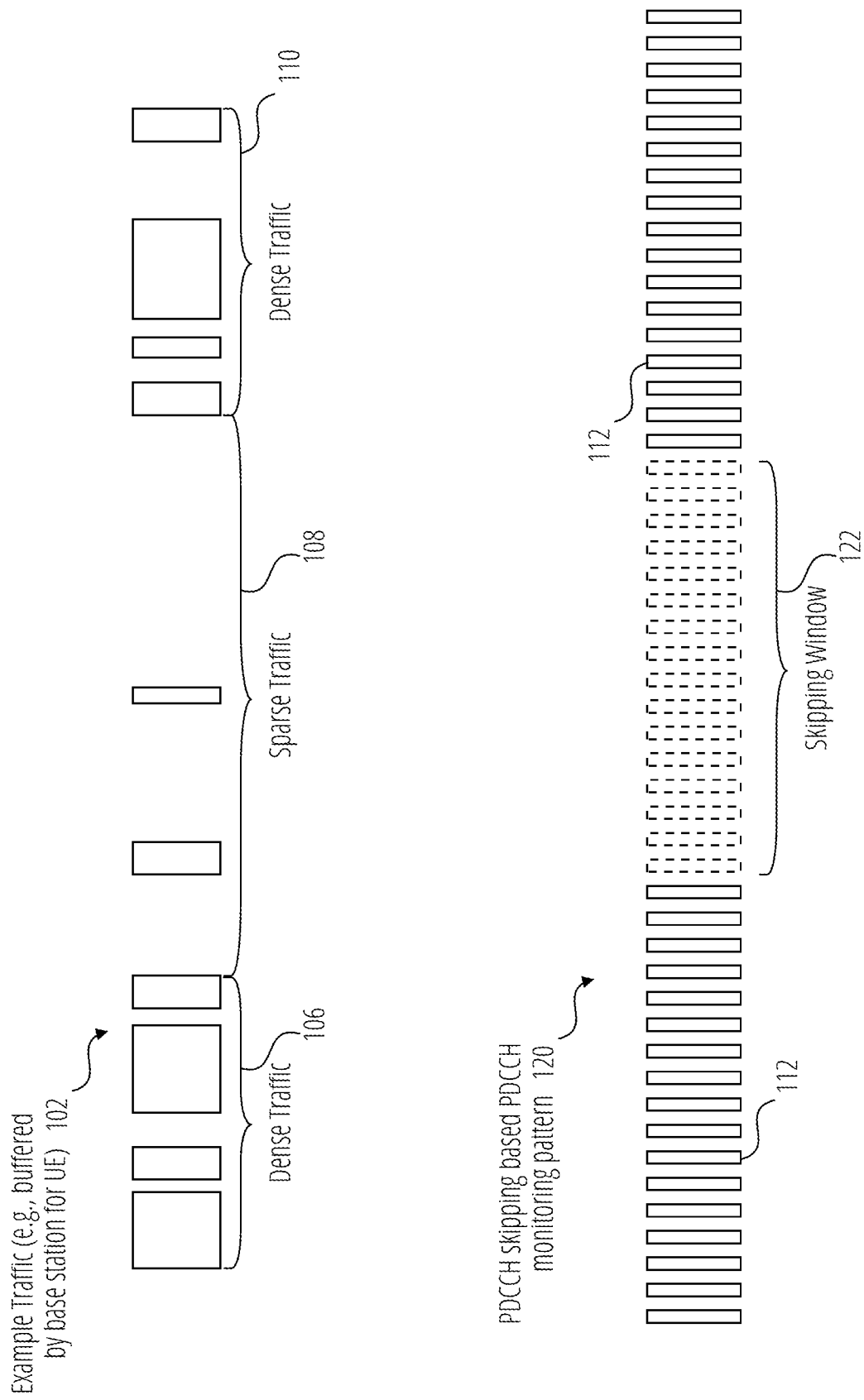
FIG. 1B illustrates an example of skipping PDCCH search space monitoring in accordance with one embodiment.
Figure 1C:
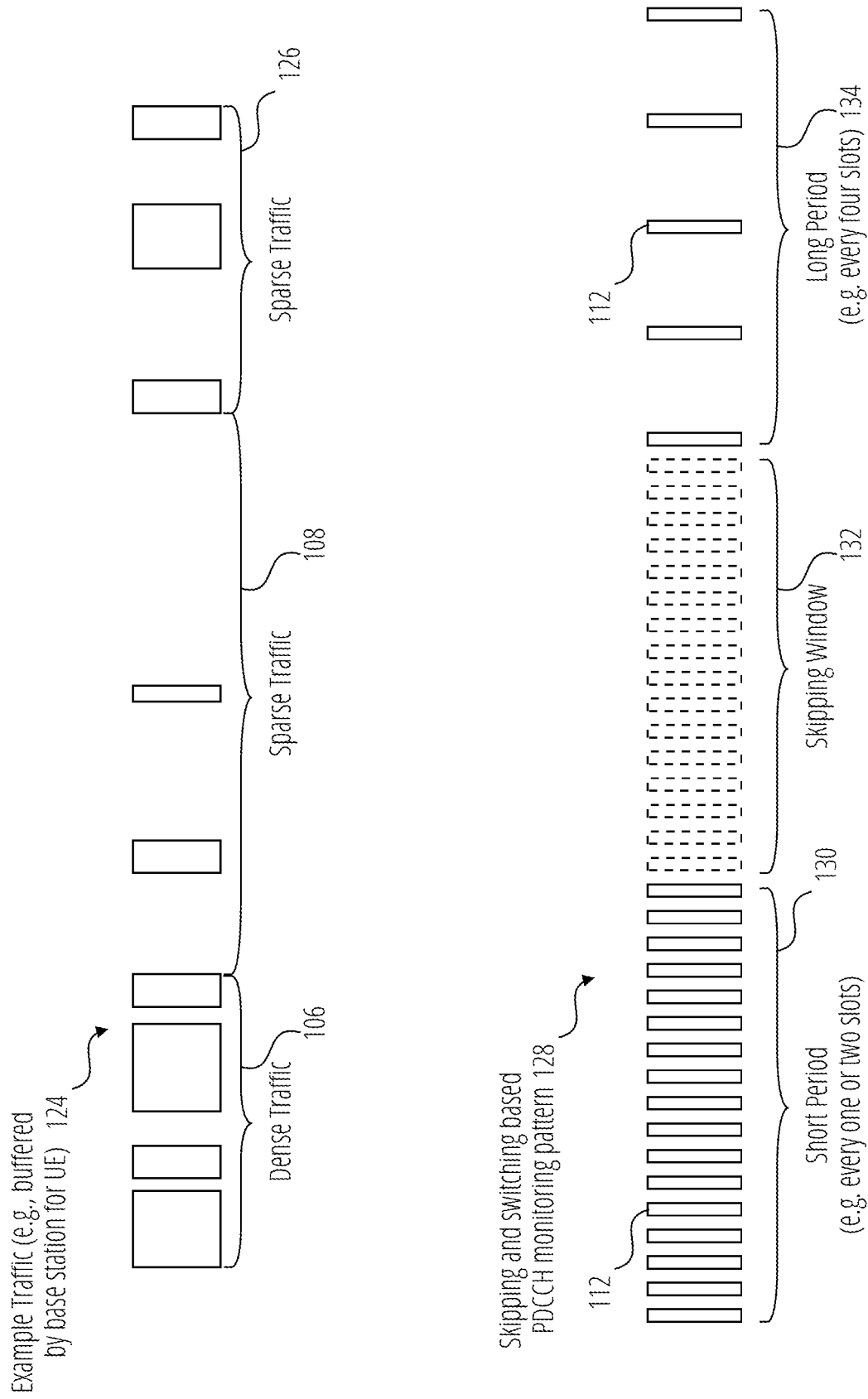
FIG. 1C illustrates an example of switching PDCCH monitoring and skipping PDCCH monitoring in accordance with one embodiment.

By way of example, for PDCCH monitoring, each BWP configured for the UE can be associated with up to three CORESETs and up to ten PDCCH search space sets. In one example, the number of PDCCH candidates per aggregation level can be configured among {0, 1, 2, 3, 4, 5, 6, 8} for each PDCCH search space. Monitoring periodicities of different PDCCH search space sets can be different and may be selected from a set of possible values of {1, 2, 4, 5, 8, 10, 16, 20} slots, for example. Additionally or alternatively, the PDCCH monitoring (or blind decoding) can be skipped during a slot window having a length of {4, 18, 12, 16} slots, for example. FIG. 1A illustrates switching between different monitoring periodicities. FIG. 1B illustrates skipping the PDCCH monitoring for a number of slots. FIG. 1C illustrates a combination of the switching and the skipping. Each of these figures is described herein below.

In certain embodiments, signaling between the base station and the UE may be used to indicate the monitoring periodicity and/or the number of slots to skip. In an example, RRC information and DCI are used for the signaling such that the signaling can allow adaptive PDCCH monitoring, with little or no increase to the signaling overhead. For example, the RRC information can include a candidate set of PDCCH monitoring configurations, each PDCCH monitoring configuration being a switching configuration or a skipping configuration (i.e., a switching configuration only, a skipping configuration only, or a combination of a switching configuration and a skipping configuration). Generally, a PDCCH configuration is a configuration that is set up for the UE by the base station via RRC signaling and can be referred to herein also as an "RRC configuration" to indicate the RRC nature of the setup. A switching configuration may indicate a specific monitoring periodicity from the set of {1, 2, 4, 5, 8, 10, 20} slots, for example. A skipping configuration indicates a specific number of slots to skip from the set of {4, 8, 12, 16} slots, for example. DCI information can include the particular PDCCH monitoring configuration(s) to use from the set. For example, the DCI information can indicate that a monitoring periodicity of two slots and/or eight slots to skip. For instance, the DCI can include bits, whereby the combination of bit values indicates the PDCCH monitoring configuration(s).

FIG. 1A illustrates an example of switching PDCCH monitoring periodicity according to certain embodiments. Example traffic 102 is shown with respect to an SSSG switching based PDCCH monitoring pattern 104. The example traffic 102 represents arrival times and package sizes of data at a base station (e.g., data buffered by base station 512 for sending to UE 502 shown in FIG. 5). The example traffic 102 is variable over time with dense traffic 106 followed by sparse traffic 108, which in turn is followed by dense traffic 110. The dense traffic 106 and the dense traffic 110 include relatively large amounts of data buffered by the base station for the UE, as compared to the amount of data buffered over a similar time period by the base station for the UE during the sparse traffic 108. As used herein, "dense" and "sparse" are relative terms, where dense refers to the amount of traffic being larger than a first threshold, and where sparse refers to the amount of traffic being smaller than the first threshold or a smaller second threshold. The specific threshold(s) may depend on a number of factors such as the total amount of traffic per UE, per component carrier, and the like.

The SSSG switching based PDCCH monitoring pattern 104 adapts to the DL traffic from the base station, or UL traffic from the UE based on buffer status report. While the illustrated example is for DL traffic, SSSG switching and/or PDCCH skipping can be based on UL traffic as well. For UL traffic, for example, the base station may make SSSG switching and/or PDCCH skipping decisions based on a buffer stations report of UL traffic. In the illustrated example, the SSSG switching based PDCCH monitoring pattern 104 is adapted to the example traffic 102 such that when the example traffic 102 is dense (as in the dense traffic 106 and the dense traffic 110), the periodicity at which the search spaces are monitored is increased. In comparison, when the example traffic 102 is sparse (as in the sparse traffic 108), the periodicity at which the PDCCH search spaces 112 are monitored is decreased.

In an example, PDCCH monitoring periodicity refers to a number of slots at which DCI may be expected and blind decoding of a PDCCH search space is to be performed to decode or attempt to decode the DCI. The PDCCH monitoring periodicity can also be referred to as search space (SS) periodicity or switching period. For example, a PDCCH monitoring periodicity of two indicates that DCI may be expected every two slots and that PDCCH search spaces are to be monitored every two slots. A slot is a unit of time having a duration based on the sub-carrier spacing (SCS). For instance, the slot duration is 1 millisecond (ms), 0.5 ms, 0.25 ms, 0.125 ms, and 0.0625 ms for SCS of 15 kHz, 30 kHz, 60 kHz, 122 kHz, and 240 kHz, respectively.

As shown in the example of FIG. 1A, for the dense traffic 106, a short period 114 (e.g., PDCCH search spaces are monitored every one slot or every two slots) is used. For the sparse traffic 108, a long period 116 is used (e.g., PDCCH search spaces are monitored every four or more slots). For the dense traffic 110, a short period 118 is used, which may be the same or different than the short period 114. Thus, SSSG switching performs PDCCH monitoring using different periodicities over time, where the monitoring switches between long and short periods for adaptation with traffic variation.

FIG. 1B illustrates an example of skipping PDCCH search space monitoring according to certain embodiments. This example illustrates the example traffic 102 shown in FIG. 1A (with dense traffic 106, sparse traffic 108, and dense traffic 110) with respect to a PDCCH skipping based PDCCH monitoring pattern 120. When the example traffic 102 is dense (as in the case of the dense traffic 106 and the dense traffic 110), DCI may exist and the PDCCH search spaces 112 are monitored. However, when the example traffic 102 is sparse (as in the case of the sparse traffic 108), the PDCCH monitoring may be skipped. The skipping may include not receiving PDCCH (e.g., by deactivating a radio reception path) or receiving PDCCH and not performing blind decoding, for example. The skipping may occur over a number of slots (from the set of {4, 8, 12, 16} slots), shown as a skipping window 122 (also referred to as a skipping step or stepping size). During the skipping window 122, the PDCCH monitoring is not performed at slots where, otherwise, the PDCCH monitoring would have been performed (shown as rectangles with dashed lines in FIG. 1B). As such, the PDCCH monitoring may be skipped during the skipping window 122, and the length or duration of the skipping window 122 (e.g., the number of slots) may depend on the traffic buffered by the base station for the UE. In certain systems, PDCCH skipping is a one-time operation implemented either by using an empty SSSG with a timer to emulate PDCCH skipping or by using a DCI bit field to directly indicate the skipping window 122. An empty SSSG comprises a search space set without an associated search space.

FIG. 1C illustrates an example of switching PDCCH monitoring and skipping PDCCH monitoring according to certain embodiments. This example illustrates an example traffic 124 similar to the example traffic 102 shown in FIG. 1A and FIG. 1B (with dense traffic 106 and sparse traffic 108). However, rather than including the dense traffic 110 shown in FIG. 1A and FIG. 1B, the example traffic 124 shown in FIG. 1C includes sparse traffic 126 (although denser than sparse traffic 108). The example traffic 124 is shown with respect to a skipping and switching based PDCCH monitoring pattern 128. In this example, for the dense traffic 106, a short period 130 is used wherein PDCCH search spaces 112 are monitored every one or two slots for potential DCI, for example. For the sparse traffic 108, skipping is used during a skipping window 132 wherein the PDCCH monitoring is not performed. For the sparse traffic 126, because it is denser than the sparse traffic 108, the PDCCH monitoring is performed but a long period 134 is used wherein the PDCCH search spaces 112 are monitored every four slots or more, for example. As such, PDCCH monitoring may use one or more periodicities and one or more skipping windows over time depending on the traffic buffered by the base station for the UE.

For certain wireless systems, a UE may exhibit various behaviors after receiving a PDCCH indication of monitoring adaptation. In a first behavior, for example, PDCCH skipping is not activated. In another UE behavior, PDCCH skipping may be used, which means stopping PDCCH monitoring for a duration X. In such wireless systems, however, certain details have not yet been agreed to, such as possible values for X, whether and how to support more than one skipping duration, and whether to continue monitoring PDCCH scrambled by cell radio network temporary identifier (C-RNTI) for Type 0/1/1A/2 CSS or not. Other details have also not yet been determined, such as indicating PDCCH skipping when three SSSGs are configured, whether or how to switch from a non-default SSSG to another non-default SSSG, using timers for switching between multiple SSSGs, and how to configure a UE to fall back to a default SSSG after timer expiration.

Thus, one embodiment disclosed herein provides SSSG switching with multiple timers and non-default to non-default state transition. In addition, or in another embodiment, a default SSSG configuration and a timer value range are provided. Another embodiment provides PDCCH skipping when an SSSG timer expires. Another embodiment provides for determining skipping size based on SSSG. In another embodiment, non-scheduling DCI allows more bits to define a plurality of skipping durations, including skipping to the end of a DRX cycle. Other embodiments provide implicit adaptation based on a buffer status report (BSR) or scheduling request (SR) set partition.

SSSG Switching: Non-Default to Non-Default with Different Timers

Figure 2:
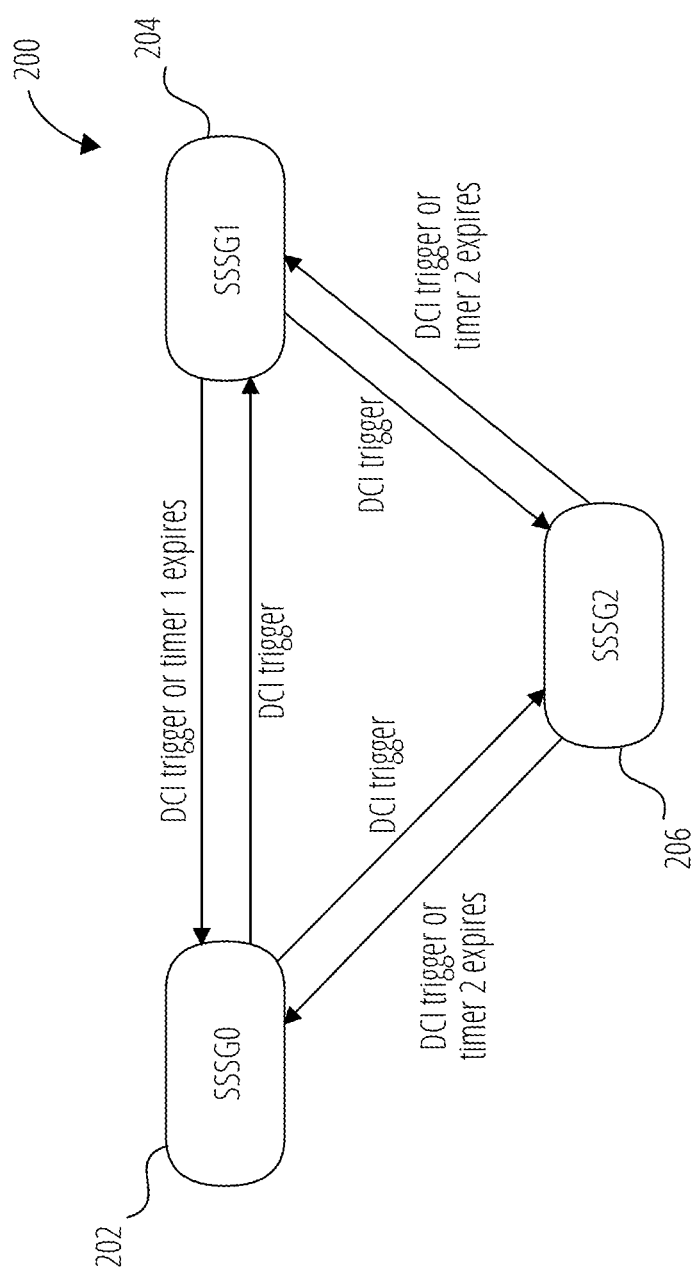
FIG. 2 illustrates an SSSG switching state diagram for non-default SSSG to non-default SSSG switching using multiple timers in accordance with one embodiment.

FIG. 2 illustrates an SSSG switching state diagram 200 for non-default SSSG to non-default SSSG switching using multiple timers according to one embodiment. The SSSG switching state diagram 200 includes a first state 202 corresponding to a default SSSG (also referred to herein as SSSG0 or the default SSSG0), a second state 204 corresponding to a first non-default SSSG (also referred to herein as SSSG1), and a third state 206 corresponding to a second non-default SSSG (also referred to herein as SSSG2). In this example, SSSG1 is non-empty and is associated with a first timer (also referred to herein as timer 1), SSSG2 is an empty SSSG and is associated with a second timer (also referred to herein as timer 2).

For switching to and from the default SSSG0, as shown in FIG. 2, in response to a DCI trigger, the UE may switch from the default SSSG0 to SSSG1, which may start timer 1. In response to another DCI trigger or when timer 1 expires, the UE switches back from SSSG1 to the default SSSG0. Similarly, the UE may switch from the default SSSG0 to SSSG2 in response to a DCI trigger, which may start timer 2, and switches back from SSSG2 to the default SSSG0 in response to another DCI trigger or when timer 2 expires.

For non-default to non-default SSSG switching, according to certain embodiments, the UE is allowed to respond to a DCI trigger to switch from SSSG1 to SSSG2, and from SSSG2 to SSSG1. After timer 2 expires while in SSSG2, according to one embodiment, the UE switches back to the previous state that triggered SSSG2. For example, if the UE switched from the default SSSG0 to SSSG2, then the UE returns to the default SSSG0 when timer 2 expires. However, if the UE switched from SSSG1 to SSSG2, then the UE returns to SSSG1 from SSSG2 when timer 2 expires. Timer 1 associated with SSSG1 may continue running even when SSSG2 is triggered such that the UE switches monitoring from SSSG1 to SSSG2. After timer 1 expires, whether monitoring in SSSG2 or SSSG1, the UE may fall back to monitoring the default SSSG0. However, when monitoring SSSG2, if timer 2 is running when timer 1 expires, the UE may wait to fall back to SSSG0 from SSSG1 until after timer 2 expires. Alternatively, the UE may freeze or pause timer 1 when switching from SSSG1 to SSSG2, and then continue counting down or resume timer 1 upon switching back to SSSG1 from SSSG2.

In another embodiment for non-default to non-default SSSG switching, after timer 2 expires while in SSSG2, the UE switches from SSSG2 to the default SSSG0, even when the UE was previously triggered by DCI to switch from SSSG1 to SSSG2. In such embodiments, timer 1 may be reset after switching to SSSG2, and the UE switches to the default SSSG0 when timer 2 expires.

SSSG Switching: Timer Value Range and Default SSSG

In certain embodiments, radio resource control (RRC) configuration is used to indicate the pattern for the default SSSG0. For example, when DCI format 2-6 (wake up signal (WUS)) is enabled, the default SSSG0 may comprise a predetermined dense SSSG pattern. When the UE finishes (DL) reception or uplink (UL) transmission early, the UE may start skipping and/or may switch to a sparse SSSG. In such embodiments, the timer value of timer 1 may be large (e.g., up to a next DRX cycle). Otherwise, if DCI format 2-6 is not enabled, the default SSSG0 pattern may be a predetermined sparse pattern selected for UE power saving, wherein the timer value of timer 1 may be set to be a small value to allow the UE to move back to the sparse SSSG faster.

In addition, or in other embodiments, RRC configuration of the timer value may be based on the default SSSG setting. When two SSSG are configured, a DCI bit may be used to toggle SSSG states and reset timer 1. However, when three SSSG are configured, such an SSSG toggle cannot be used. Thus, according to certain embodiments with three configured SSSG, two DCI bits are used to indicate three SSSG states and a state corresponding to no SSSG switching with the current DCI. For example, bit values "0 0" may indicate switching to the default SSSG0 and resetting timer 1, bit values "0 1" may indicate switching to SSSG1 and resetting timer 1, bit values "1 0" may indicate switching to SSSG2 and resetting timer 1, and bit values "1 1" may indicate no SSSG switching with this DCI and timer 1 continues to count.

In another embodiment when three SSSG are used, the two DCI bits are only used to indicate the three SSSG states (e.g., the above example reserves the bit values "1 1" rather than use "1 1" to indicate no SSSG switching). In such embodiments, each scheduling DCI indicates the same or a different SSSG configuration or state. When the DCI indicates that the same SSSG configuration is to be used as that of the current SSSG, the corresponding timer continues to count down. When the DCI indicates that an SSSG configuration is to be used that is different than the current SSSG configuration, the corresponding timer is reset. Alternatively, the timer is reset whenever an SSSG configuration is sent (i.e., always reset the timer when a scheduling DCI is sent).

Skipping with SS Switching

Figure 3:
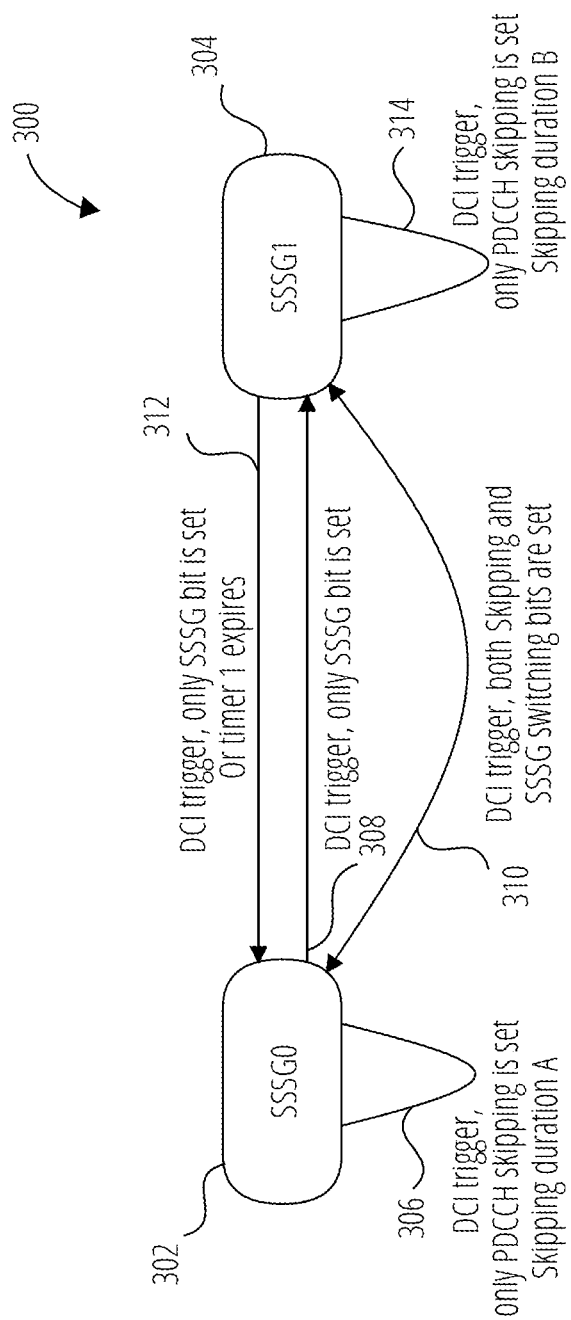
FIG. 3 illustrates a skipping with SSSG switching state diagram in accordance with one embodiment.

FIG. 3 illustrates a skipping with SSSG switching state diagram 300 according to certain embodiments. The skipping with SSSG switching state diagram 300 includes a first state 302 corresponding to the default SSSG0 and a second state 304 corresponding to SSSG1. In this example, SSSG1 is non-empty and is associated with a first timer (timer 1). In this example, two skipping steps or durations are linked to the SSSGs. The DCI trigger includes two bits. A first bit (also referred to herein as the SSSG bit) indicates the SSSG group or triggers switching SSSGs. A second bit (also referred to herein as the switching bit or PDCCH switching bit) indicates a predetermined skipping step or duration linked to the current SSSG. When both bits are set, the UE performs the skipping first and then switches to the configured SSSG.

For example, while in the default SSSG0, the UE may receive a DCI trigger 306 having only the PDCCH skipping bit set. In response to the DCI trigger 306, the UE performs skipping with a predetermined skipping step or duration A associated with the default SSSG0.

The UE may receive, while in the default SSSG0, a DCI trigger 308 having only the SSSG bit set. In response to the DCI trigger 308, the UE switches from the default SSSG0 to SSSG1 and starts timer 1.

The UE may receive, while in the default SSSG0, a DCI trigger 310 including both PDCCH skipping and SSSG switching bits set. In response to the DCI trigger 310, the UE performs PDCCH skipping with skipping duration A associated with the default SSSG0, and then the UE switches from the default SSSG0 to SSSG1.

While in SSSG1, when timer 1 expires, or if the UE receives a DCI trigger 312 with only the SSSG bit set, the UE switches back from SSSG1 to the default SSSG0.

The UE may receive, while in SSSG1, a DCI trigger 314 having only the PDCCH skipping bit set. In response to the DCI trigger 314, the UE performs skipping with a predetermined skipping step or duration B associated with SSSG1.

The UE may receive, while in SSSG1, the DCI trigger 310 including both PDCCH skipping and SSSG switching bits set. In response to the DCI trigger 310, the UE performs PDCCH skipping with skipping duration B associated with SSSG1, and then the UE switches from SSSG1 to the default SSSG0.

In one embodiment when skipping is triggered when in SSSG1, the UE freezes or pauses timer 1 while performing the skipping behavior. The UE resumes timer 1 or continues to count down after finishing the skipping behavior.

In another embodiment when skipping is triggered when in SSSG1, timer 1 continues to count down during the skipping operation. After skipping, if timer 1 expires, the UE falls back from SSSG1 to the default SSSG0.

Skipping Size Based on SSSG Configuration

The skipping step or duration may be associated with the SSSG configuration. For example, skipping step or duration may be calculated based on SSSG periodicity, where SSSG periodicity is defined as the shortest SS periodicity within the SSS group. In certain embodiments disclosed herein, a simpler method may be used by allowing RRC signaling to directly configure an SSSG associated skipping step or duration. For example, the base station may configure SSSG0 with SS sets and a first skipping step or duration (skipping step 1). The base station may also configure SSSG1 with SS sets and a corresponding second skipping step or duration (skipping step 2). Accordingly, when skipping is triggered from SSSG0 the UE uses skipping step 1, and when skipping is triggered from SSSG1 the UE uses skipping step 2 with the same triggering bit.

Skipping to the End of a DRX Cycle with Non-Scheduling DCI

In certain embodiments, non-scheduling DCI may indicate PDCCH adaptation (e.g., the switching configuration and/or the skipping configuration). For example, DCI format 1_1 can be used for indicating secondary cell (SCell) dormancy without PDSCH scheduling if the frequency domain resource allocation (FDRA) field is set to all ones when type one-resource allocation (1RA) is used, or if the FDRA field is set to all zeros when type zero-resource allocation (0RA) us used. Other formats of the non-scheduling DCI are possible, including format 2_0 and format 2_6.

In certain embodiments disclosed herein, cell-group based skipping or SS switching is applied. In one such embodiment, per cell group, more than two bits may be allowed to indicate more skipping steps or durations, including to the end of the DRX cycle. This may be helpful, for example, where DCI format 2-6 is not configured. In another embodiment, per cell group, two bits are configured but the indication may be RRC configured differently compared to the values used for scheduling based DCI.

Implicit Indication Based on BSR

DCI sent on the PDCCH can indicate DL and/or UL resources for PDSCH and/or PUSCH. Thus, in certain examples described herein the traffic is downlink traffic that includes data buffered by a base station for transmission to a UE. However, the embodiments are not limited as such and similarly apply to uplink traffic from the UE to the base station. Certain wireless systems may use SR to implicitly indicate the PDCCH adaptation for UL. However, the SR does not indicate how much data the UE has in its UL buffer. Further, switching to SSSG0 or stopping a skipping operation whenever SR is triggered can reduce UE power savings.

Thus, in certain embodiments disclosed herein, BSR is used to implicitly indicate the PDCCH adaptation for UL (e.g., the switching configuration and/or the skipping configuration). A BSR threshold may be specified or configured. If the BSR is greater than the BSR threshold, the UE stops the skipping behavior and/or switches to the default SSSG0.

Another embodiment is based on an SR partition. The SR resources may be partitioned into two sets. When the UE has a large amount of data and/or urgent traffic to send, the UE uses a first set of the SR resources to trigger the S R and stops PDCCH skipping and/or switches to the default SSSG0. When the UE does not need to change the adaptation behavior, the UE uses a second set of the SR resources to send the SR.

SSSG Monitoring in DRX Off Period

In one embodiment, the UE is configured to fall back to the default SSSG0 in the DRX off period.

In another embodiment, during the DRX off period, the UE follows the SSSG and timer condition configured or set in the DRX on duration.

Figure 4:
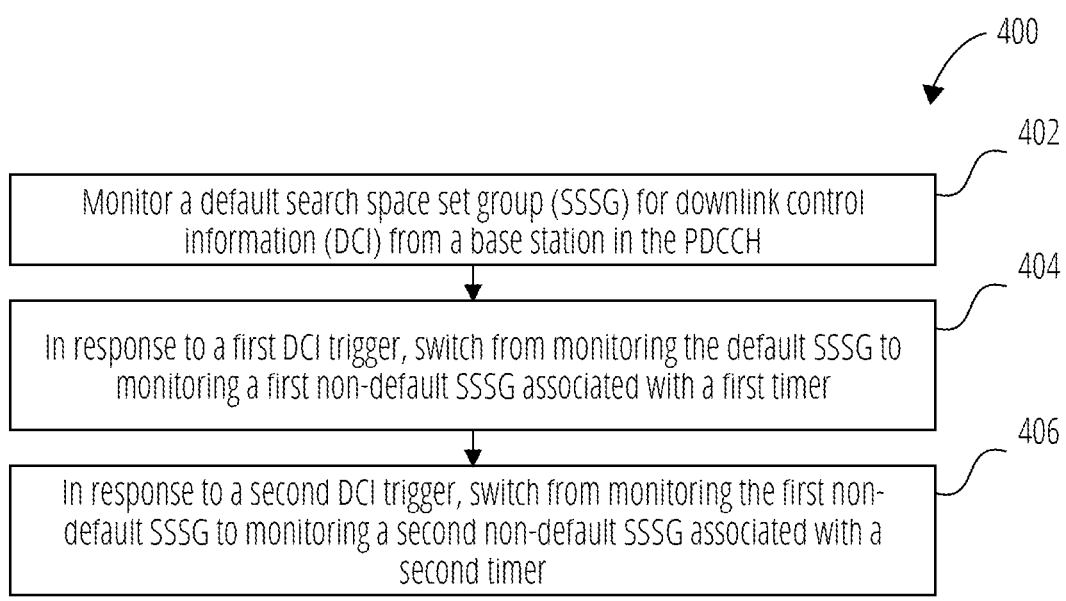
FIG. 4 illustrates a flowchart of a method for a UE to perform PDCCH monitoring adaptation in accordance with one embodiment.

FIG. 4 illustrates a flowchart of a method 400 for a UE to perform PDCCH monitoring adaptation according to one embodiment. In block 402, the method 400 includes monitoring a default SSSG for DCI from a base station in the PDCCH. In block 404, in response to a first DCI trigger, the method 400 includes switching from monitoring the default SSSG to monitoring a first non-default SSSG associated with a first timer. In block 406, in response to a second DCI trigger, the method 400 includes switching from monitoring the first non-default SSSG to monitoring a second non-default SSSG associated with a second timer.

In certain embodiments of the method 400, the first non-default SSSG is a non-empty SSSG comprising a search space set with at least one associated search space, and the second non-default SSSG is an empty SSSG with no associated search space to emulate PDCCH skipping.

The method 400 may further include, while monitoring the second non-default SSSG, switching from monitoring the second non-default SSSG to monitoring either the default SSSG or the first non-default SSSG in response to a third DCI trigger.

The method 400 may further include, while monitoring the second non-default SSSG, returning to a previous monitoring configuration in response to the second timer expiring.

In certain embodiments, the method 400 further includes switching from monitoring the default SSSG to monitoring the second non-default SSSG, wherein returning to the previous monitoring configuration comprises switching back from monitoring the second non-default SSSG to monitoring the default SSSG in response to the second timer expiring. The method 400 may further include switching from monitoring the first non-default SSSG to monitoring the second non-default SSSG, wherein returning to the previous monitoring configuration comprises switching back from monitoring the second non-default SSSG to monitoring the first non-default SSSG in response to the second timer expiring.

In certain embodiments, the method 400 further includes continuing to run the first timer after switching from monitoring the first non-default SSSG to monitoring the second non-default SSSG. In one such embodiment, after the first timer expires, the method 400 includes falling back to monitoring the default SSSG. Alternatively, when the second timer is running while the first timer expires, the method 400 includes waiting until the second timer expires before falling back to monitoring the default SSSG.

In one embodiment, the method 400 further includes pausing the first timer after switching from monitoring the first non-default SSSG to monitoring the second non-default SSSG, and resuming the first timer after switching back from monitoring the second non-default SSSG to monitoring the first non-default SSSG.

In certain embodiments, the method 400 further includes while monitoring the second non-default SSSG, switching from the second non-default SSSG to the default SSSG in response to the second timer expiring regardless of a previous monitoring configuration. The method 400 may further include: switching from monitoring the first non-default SSSG to monitoring the second non-default SSSG; resetting the first timer; and in response to the second timer expiring, switching from the second non-default SSSG to the default SSSG.

In certain embodiments, the first DCI trigger comprises an SSSG bit and a PDCCH skipping bit, and the method 400 further includes switching from monitoring the default SSSG to monitoring the first non-default SSSG in response to the SSSG bit being set. In certain such embodiments, the PDCCH skipping bit of the first DCI trigger is also set and the method 400 further includes performing PDCCH skipping using a first skipping duration associated with the default SSSG in response to the PDCCH skipping bit being set before switching from monitoring the default SSSG to monitoring the first non-default SSSG in response to the SSSG bit being set.

In certain embodiments, while monitoring the second non-default SSSG, the method 400 further includes: determining the SSSG bit and the PDCCH skipping bit in a third DCI trigger; when the PDCCH skipping bit in the third DCI trigger is set and the SSSG bit in the third DCI trigger is not set, performing PDCCH skipping using a second skipping duration associated with the first non-default SSSG; when the PDCCH skipping bit in the third DCI trigger is not set and the SSSG bit in the third DCI trigger is set, or in response to the first timer expiring, switching from monitoring the first non-default SSSG to monitoring the default SSSG; and when both the PDCCH skipping bit in the third DCI trigger is set and the SSSG bit in the third DCI trigger is set, performing PDCCH skipping using the second skipping duration before switching from monitoring the first non-default SSSG to monitoring the default SSSG. In certain such embodiments, while monitoring the second non-default SSSG, when the PDCCH skipping bit in the third DCI trigger is set, the method 400 further includes: pausing the first timer while performing PDCCH skipping using the second skipping duration; and resuming the first timer after performing PDCCH skipping using the second skipping duration. Alternatively, while monitoring the second non-default SSSG, when the PDCCH skipping bit in the third DCI trigger is set, the method 400 further includes: continuing counting using the first timer while performing PDCCH skipping using the second skipping duration; and after performing PDCCH skipping using the second skipping duration, in response to the first timer expiring, switching back from monitoring the first non-default SSSG to monitoring the default SSSG.

In one embodiment, the method 400 further includes determining an SSSG pattern of the default SSSG based on a DCI format associated with a radio resource control (RRC) configuration of the default SSSG, wherein when a DCI format 2-6 is enabled the SSSG pattern of the default SSSG comprises a dense pattern, and wherein when the DCI format 2-6 is not enabled the SSSG pattern of the default SSSG comprises a sparse pattern.

In certain embodiments, at least one of the first DCI trigger and the second DCI trigger comprises two bits, and a first value the two bits indicates a first SSSG configuration corresponding to the default SSSG, a second value of the two bits indicates a second SSSG configuration corresponding to the first non-default SSSG, and a third value of the two bits indicates a third SSSG configuration corresponding to the second non-default SSSG. In certain such embodiments, a fourth value of the two bits indicates that no SSSG switching is to occur between the first SSSG configuration, the second SSSG configuration, and the third SSSG configuration. In another embodiment, the method 400 further includes: when the two bits indicate a new SSSG configuration that is the same as a current SSSG configuration, the first timer or the second timer continues to count down; and when the two bits indicate the new SSSG configuration is different than the current SSSG configuration, the first timer or the second timer resets. In another embodiment, the method 400 further includes resetting the first timer or the second timer when scheduling DCI is sent.

In one embodiment, the method 400 further includes: based on radio resource control (RRC) signaling from the base station, configuring a first skipping duration associated with the default SSSG, and a second skipping duration associated with the first non-default SSSG; when skipping is triggered from the default SSSG using a triggering bit, performing PDCCH skipping using the first skipping duration; and when skipping is triggered from the first non-default SSSG using the triggering bit, performing PDCCH skipping using the second skipping duration.

In one embodiment, the method 400 further includes performing cell-group based PDCCH skipping or SSSG switching, wherein per cell group more than two bits in non-scheduling DCI indicate a plurality of PDCCH skipping durations, and wherein the plurality of PDCCH skipping durations include skipping to an end of a discontinuous reception (DRX) cycle.

In one embodiment, the method 400 further includes performing cell-group based PDCCH skipping or SSSG switching, wherein per cell group two bits in non-scheduling DCI indicate a plurality of PDCCH skipping durations.

In one embodiment, the method 400 further includes: comparing a value of a buffer status report (BSR) corresponding to data in an uplink buffer to a BSR threshold; when the value of the BSR is less than the BSR threshold, performing PDCCH skipping; and when the value of the BSR is greater than the BSR threshold, performing at least one of stopping the PDCCH skipping and switching to the default SSSG.

In one embodiment, the method 400 further includes: partitioning scheduling request (SR) resources into a first set and a second set; when an amount of uplink data to be sent to the base station from the UE exceeds a threshold or is designated as urgent, using the first set to send an SR and performing at least one of stopping PDCCH skipping and switching to the default SSSG; and when the amount of uplink data to be sent to the base station from the UE is below the threshold or is not designated as urgent, using the second set to send the SR.

In one embodiment, the method 400 further includes, in a discontinuous reception (DRX) off period, falling back to monitoring the default SSSG.

In one embodiment, the method 400 further includes, in a discontinuous reception (DRX) off period, using an SSSG configuration and timer condition set during a preceding DRX on period.

Embodiments contemplated herein include an apparatus comprising means to perform one or more elements of the method 400. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the method 400. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a wireless device 602 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN. E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to 5GC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include a PDCCH monitoring adaptation module 616. The PDCCH monitoring adaptation module 616 may be implemented via hardware, software, or combinations thereof. For example, the PDCCH monitoring adaptation module 616 may be implemented as a processor, circuit, and/or instructions 608 stored in the memory 606 and executed by the processor(s) 604. In some examples, the PDCCH monitoring adaptation module 616 may be integrated within the processor(s) 604 and/or the transceiver(s) 610. For example, the PDCCH monitoring adaptation module 616 may be implemented by a combination of software components (e.g., executed by a DSP or a general processor) and hardware components (e.g., logic gates and circuitry) within the processor(s) 604 or the transceiver(s) 610.

The PDCCH monitoring adaptation module 616 may be used for various aspects of the present disclosure, for example, aspects of FIG. 2 to FIG. 4.

The network device 618 may include one or more processor(s) 620. The processor(s) 620 may execute instructions such that various operations of the network device 618 are performed, as described herein. The processor(s) 620 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 618 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a PDCCH monitoring adaptation module 632. The PDCCH monitoring adaptation module 632 may be implemented via hardware, software, or combinations thereof. For example, the PDCCH monitoring adaptation module 632 may be implemented as a processor, circuit, and/or instructions 624 stored in the memory 622 and executed by the processor(s) 620. In some examples, the PDCCH monitoring adaptation module 632 may be integrated within the processor(s) 620 and/or the transceiver(s) 626. For example, the PDCCH monitoring adaptation module 632 may be implemented by a combination of software components (e.g., executed by a DSP or a general processor) and hardware components (e.g., logic gates and circuitry) within the processor(s) 620 or the transceiver(s) 626.

The PDCCH monitoring adaptation module 632 may be used for various aspects of the present disclosure, for example, aspects of FIG. 2 to FIG. 4.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) for physical downlink control channel (PDCCH) monitoring adaptation, the method comprising:
   monitoring a default search space set group (SSSG) for downlink control information (DCI) from a base station in the PDCCH;
   in response to a first DCI trigger, switching from monitoring the default SSSG to monitoring a first non-default SSSG associated with a first timer;
   in response to a second DCI trigger, switching from monitoring the first non-default SSSG to monitoring a second non-default SSSG associated with a second timer, wherein at least one of the first DCI trigger and the second DCI trigger comprises two bits, and wherein a first value the two bits indicates a first SSSG configuration corresponding to the default SSSG, a second value of the two bits indicates a second SSSG configuration corresponding to the first non-default SSSG, and a third value of the two bits indicates a third SSSG configuration corresponding to the second non-default SSSG, and wherein:
      when the two bits indicate a new SSSG configuration that is the same as a current SSSG configuration, the first timer or the second timer continues to count down; and
      when the two bits indicate the new SSSG configuration is different than the current SSSG configuration, the first timer or the second timer resets; and
   after switching from the first non-default SSSG to monitoring the second non-default SSSG, in response to the first timer expiring, switching to monitoring the default SSSG.

2. The method of claim 1, wherein the first non-default SSSG is a non-empty SSSG comprising a search space set with at least one associated search space, and wherein the second non-default SSSG is an empty SSSG with no associated search space to emulate PDCCH skipping.

3. The method of claim 2, further comprising, while monitoring the second non-default SSSG, switching from monitoring the second non-default SSSG to monitoring either the default SSSG or the first non-default SSSG in response to a third DCI trigger.

4. The method of claim 2, further comprising, while monitoring the second non-default SSSG, returning to a previous monitoring configuration in response to the second timer expiring.

5. The method of claim 4, further comprising switching from monitoring the default SSSG to monitoring the second non-default SSSG, wherein returning to the previous monitoring configuration comprises switching back from monitoring the second non-default SSSG to monitoring the default SSSG in response to the second timer expiring.

6. The method of claim 4, further comprising switching from monitoring the first non-default SSSG to monitoring the second non-default SSSG, wherein returning to the previous monitoring configuration comprises switching back from monitoring the second non-default SSSG to monitoring the first non-default SSSG in response to the second timer expiring.

7. The method of claim 6, further comprising continuing to run the first timer after switching from monitoring the first non-default SSSG to monitoring the second non-default SSSG.

8. The method of claim 7, further comprising, after the first timer expires, falling back to monitoring the default SSSG.

9. The method of claim 7, further comprising, when the second timer is running while the first timer expires, waiting until the second timer expires before falling back to monitoring the default SSSG.

10. The method of claim 6, further comprising:
pausing the first timer after switching from monitoring the first non-default SSSG to monitoring the second non-default SSSG; and
resuming the first timer after switching back from monitoring the second non-default SSSG to monitoring the first non-default SSSG.

11. The method of claim 2, further comprising, while monitoring the second non-default SSSG, switching from the second non-default SSSG to the default SSSG in response to the second timer expiring regardless of a previous monitoring configuration.

12. The method of claim 11, further comprising:
switching from monitoring the first non-default SSSG to monitoring the second non-default SSSG;
resetting the first timer; and
in response to the second timer expiring, switching from the second non-default SSSG to the default SSSG.

13. The method of claim 2, wherein the first DCI trigger comprises an SSSG bit and a PDCCH skipping bit, the method further comprising switching from monitoring the default SSSG to monitoring the first non-default SSSG in response to the SSSG bit being set.

14. The method of claim 13, wherein the PDCCH skipping bit of the first DCI trigger is also set, the method further comprising performing PDCCH skipping using a first skipping duration associated with the default SSSG in response to the PDCCH skipping bit being set before switching from monitoring the default SSSG to monitoring the first non-default SSSG in response to the SSSG bit being set.

15. The method of claim 14, while monitoring the second non-default SSSG, the method further comprises:
determining the SSSG bit and the PDCCH skipping bit in a third DCI trigger;
when the PDCCH skipping bit in the third DCI trigger is set and the SSSG bit in the third DCI trigger is not set, performing PDCCH skipping using a second skipping duration associated with the first non-default SSSG;
when the PDCCH skipping bit in the third DCI trigger is not set and the SSSG bit in the third DCI trigger is set, or in response to the first timer expiring, switching from monitoring the first non-default SSSG to monitoring the default SSSG; and
when both the PDCCH skipping bit in the third DCI trigger is set and the SSSG bit in the third DCI trigger is set, performing PDCCH skipping using the second skipping duration before switching from monitoring the first non-default SSSG to monitoring the default SSSG.

16. The method of claim 15, while monitoring the second non-default SSSG, when the PDCCH skipping bit in the third DCI trigger is set, the method further comprises:
pausing the first timer while performing PDCCH skipping using the second skipping duration; and
resuming the first timer after performing PDCCH skipping using the second skipping duration.

17. The method of claim 15, while monitoring the second non-default SSSG, when the PDCCH skipping bit in the third DCI trigger is set, the method further comprises:
continuing counting using the first timer while performing PDCCH skipping using the second skipping duration; and
after performing PDCCH skipping using the second skipping duration, in response to the first timer expiring, switching back from monitoring the first non-default SSSG to monitoring the default SSSG.

18. The method of claim 1, further comprising determining an SSSG pattern of the default SSSG based on a DCI format associated with a radio resource control (RRC) configuration of the default SSSG, wherein when a DCI format 2-6 is enabled the SSSG pattern of the default SSSG comprises a dense pattern, and wherein when the DCI format 2-6 is not enabled the SSSG pattern of the default SSSG comprises a sparse pattern.

19. The method of claim 1, wherein a fourth value of the two bits indicates that no SSSG switching is to occur between the first SSSG configuration, the second SSSG configuration, and the third SSSG configuration.

\* \* \* \* \*